United States Patent [19]
Ditlinger

[11] 3,782,220
[45] Jan. 1, 1974

[54] TENSION-TORSION TIE BAR

[75] Inventor: Richard J. Ditlinger, South Bend, Ind.

[73] Assignee: The Bendix Corporation, South Bend, Ind.

[22] Filed: May 18, 1972

[21] Appl. No.: 254,515

[52] U.S. Cl..................... 74/579 R, 74/581, 287/81
[51] Int. Cl. ............................................... F16c 7/04
[58] Field of Search ............... 74/581, 579; 287/79, 287/81

[56] References Cited
UNITED STATES PATENTS

| | | | |
|---|---|---|---|
| 3,370,483 | 2/1968 | Ditlinger.............................. | 74/579 |
| 3,475,988 | 11/1969 | Ditlinger et al....................... | 74/579 |
| 3,328,229 | 6/1967 | Windecker........................ | 287/81 x |
| 3,702,709 | 11/1972 | Shaffer................................. | 287/81 |

Primary Examiner—Charles J. Myhre
Assistant Examiner—F. D. Shoemaker
Attorney—Gordon H. Chenez et al.

[57] ABSTRACT

A laminated tie bar or coupling particularly adapted to interconnect a helicopter rotor arm and rotor blade is provided with a pair of spaced-apart end bushings interconnected by an endless belt. A pair of annular clips encircle the belt adjacent the bushings to draw opposite sides of the belt into parallel alignment. Each clip abuts an associated transverse bar or pin extending between the belt sides and attached to an adjacent end bushing by a layer of flexible strands or wires wound around the end bushing and bar or pin. The bars or pins hold the clips apart and permit twisting of the coupling about an axis extending through the end bushings.

6 Claims, 3 Drawing Figures

PRIOR ART

PATENTED JAN 1 1974

3,782,220

TENSION-TORSION TIE BAR

BACKGROUND OF THE INVENTION

The present invention relates to a flexible laminated coupling commonly known as a tie bar.

Tie bars having a pair of end bushings connected by a laminated endless belt are well known as evidenced by U.S. Pat. No. 3,603,173 issued Sept. 7, 1971 to Peter Brooks (common assignee) which patent discloses two different structures for maintaining a predetermined spacing between the end clips thereof one of which structures includes an elastomeric column and the other of which includes a laminated column wherein washer-like laminates are formed of a rigid material.

The above mentioned prior art tie bar structures have been found not entirely satisfactory under certain operating conditions. For example, when operating in an oil or the like bath, the elastomeric column has a tendency to become slippery causing undesirable extrusion thereof around the transverse pins bearing thereagainst whereas the laminated column does not deteriorate but tends to cause an increase in the rate of deterioration of the endless belt and thus shorten the life thereof.

Also it will be recognized that it is desirable to reduce the torsional stiffness of the tie bar when twisted about an axis passing through the end bushings to a minimum.

SUMMARY OF THE INVENTION

It is therefore an object of the present invention to provide a laminated coupling or tie bar particularly adapted for use in an oil bath environment.

It is another object of the present invention to provide a flexible laminated coupling or tie bar having relatively low torsional resistance to twisting about a longitudinal axis thereof.

It is an important object of the present invention to provide a flexible laminated coupling or tie bar having improved weight and resistance to deterioration characteristics.

Figure 3:
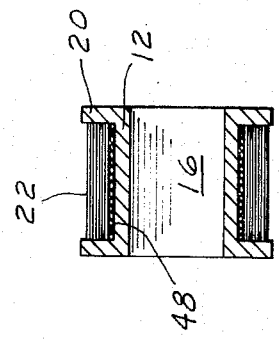

A laminated coupling or tie bar generally indicated by 10 includes a pair of spaced-apart end bushings 12 and 14 having openings 16 and 18, respectively, therethrough which are adapted to receive mating shafts or pins, not shown, forming part of the operating environment such as helicopter rotor structure, not shown, for which the tie bar is particularly adapted. Each of the end bushings 12 and 14 is provided with integral spaced-apart flange portions only one of which, 20, is shown. A laminated endless belt 22 wrapped around end bushings 12 and 14 is retained thereon by the spaced-apart flange portions including flange 20.

Reference is made to U.S. Pat. No. 3,388,615 (common assignee) for additional details of end bushings 12 and 14 if desired.

The endless belt 22 may be formed of a plurality of wires or filaments suitably integrated by a polyurethane adhesive such as disclosed in detail in U.S. Pat. No. 3,460,628 (common assignee). Longitudinally extending side portions 24 and 26 of belt 22 are encircled by spaced-apart clips 28 and 30 which occupy a position adjacent associated end bushings 12 and 14 and draw the side portions 24 and 26 toward each other to establish a spaced-apart parallel relationship thereof and thus a rectangular opening 32. Each clip 28 and 30 may be formed of two half sections 34 and 36 to facilitate assembling the clips 28 and 30 to belt 22. The half sections 34 and 36 are fixedly secured together by a plurality of circumferential wrappings of filaments or wires 38 which are received by a circumferential recess 40 in each clip 28 and 30.

Figure 1:
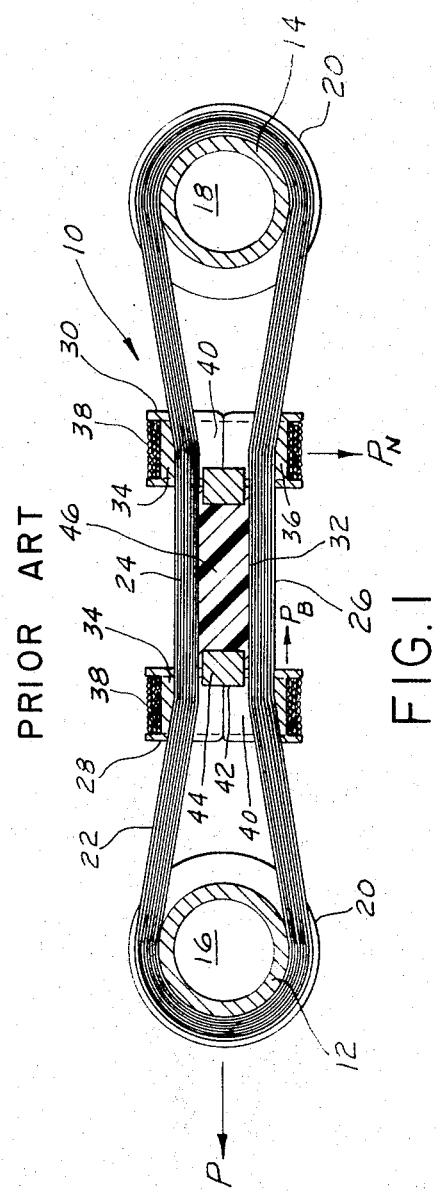
Referring to FIGS. 1 and 2, structural elements identical in both figures are identified by the same reference numeral.

The tie bar 10, in its operating environment on a helicopter, must be capable of withstanding various forces imposed thereon. An axially directed tension force P acts on the tie bar 10 resulting in a pair of force components acting on the clips 28 and 30. One of the force components $P_N$ acts radially outwardly against half sections 34 and 36 tending to separate the same in opposition to the retaining force derived from circumferential wrappings of wire 38. Another force, $P_B$, tends to urge clips 28 and 30 toward the center of the tie bar 10. Force $P_B$ must be resisted but, since low torsional resistance of the tie bar is desirable, a solid non-deformable spacing member in opening 32 to maintain separation of clips 28 and 30 is not practical. In the prior art tie bar of FIG. 1, a keyway 42 is provided in each of the annular clips 28 and 30 which keyway 42 is adapted to receive a mating bar or pin 44 extending transversely between side portions 24 and 26. A deformable urethane core piece 46 is interposed between the bars or pins 44 to maintain the same in spaced relationship. The urethane core piece is strong enough to prevent the bars or pins 44 and thus clips 28 and 30 from sliding toward each other as well as sufficiently resilient to permit twisting of the tie bar. Such a tie bar performs satisfactorily with the exception that use of the same in a relatively high temperature oil bath results in a tendency for the urethane core piece 46 to extrude between the bars or pins 44 and the side portions 24 and 26 thereby reducing the operating life of the tie bar 10.

Figure 2:
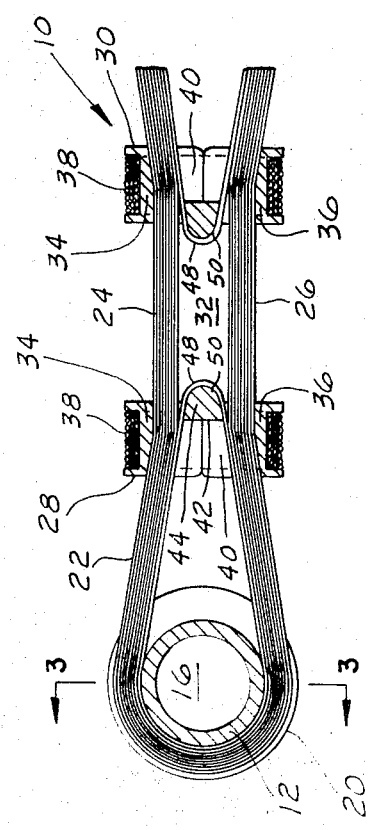

Referring to FIG. 2, the urethane core piece 46 is deleted and replaced by a layer of filament material or wire wrappings 48 wound around each bar or pin 44 and its adjacent end bushing 12 or 14. The bars or pins 44 are each preferably provided with a curved portion 50 to accommodate the continuous filament or wire 48 which is wrapped around the bar or pin 44 and its adjacent end bushing 12 or 14 prior to wrapping of the belt 42 around end bushings 12 and 14. The half sections 34 and 36 of each clip 28 and 30 are positioned on belt 22 adjacent the respective end bushings 12 and 14 and drawn together by circumferential wrappings 28 thereby forcing the side portions 24 and 26 toward each other and into engagement with adjacent layers of wire 48 which, in turn, are deflected resulting in trapping of the bar or pin 44 in keyway 42. If desired, the remaining void or opening 32 may be left open or filled with a suitable resilient material such as urethane.

It will be noted that the bars or pins 44 and thus clips 12 and 14 bearing thereagainst are restrained from sliding toward each other by the layers of wire wrappings 48 which also provide relatively low torsional resistance to twisting motion of the tie bar about its longitudinal axis passing through end bushings 12 and 14.

I claim:
1. A tie bar comprising:
    a pair of spaced-apart bushings;
    an endless belt encircling said pair of spaced-apart bushings and having spaced-apart side portions;

clip means operatively connected to said endless belt adjacent each of said bushings for urging said side portions together to establish a predetermined spaced-apart relationship thereof;

retaining means including a pin extending between said side portions and transversely thereto into engagement with said clip means; and a plurality of windings of a filament material encircling said transverse pin and associated bushing;

said retaining means connecting each of said bushings to said clip means adjacent thereto for maintaining said clip means in predetermined spaced-apart relationship.

2. A tie bar as claimed in claim 1, wherein:
said clip means surrounds said belt and includes two half portions held together by a plurality of windings of a filament material encircling the same.

3. A tie bar as claimed in claim 1, wherein:
said filament material is a continuous metal wire.

4. A tie bar as claimed in claim 1, wherein:
said plurality of windings of filament material are trapped between said bushing and endless belt.

5. A tie bar as claimed in claim 1, wherein:
said endless belt is defined by a plurality of layers of a filament material integrated by an adhesive material.

6. A tie bar as claimed in claim 1, wherein:
said clip means is provided with keyway portions adapted to receive the ends of said pins.

* * * * *